(12) United States Patent
Hironimus

(10) Patent No.: US 7,543,433 B2
(45) Date of Patent: Jun. 9, 2009

(54) AGRICULTURAL MACHINE FOR CUTTING PRODUCTS

(75) Inventor: Jeannot Hironimus, Schwebwiller (FR)

(73) Assignee: Kuhn S.A., Saverne (FR)

( * ) Notice: Subject to any disclaimer, the term of this patent is extended or adjusted under 35 U.S.C. 154(b) by 190 days.

(21) Appl. No.: 11/341,454

(22) Filed: Jan. 30, 2006

(65) Prior Publication Data
US 2006/0174599 A1 Aug. 10, 2006

(30) Foreign Application Priority Data
Feb. 9, 2005 (FR) ................................. 05 50384

(51) Int. Cl.
*A01D 43/00* (2006.01)
(52) U.S. Cl. ................. 56/159; 180/89.13; 180/327
(58) Field of Classification Search ............ 180/89.13, 180/327, 326, 329, 330, 324, 328; 296/190.04, 296/190.07, 190.05, 190.01; 172/435; 280/775; 56/15.2, 14.5, 159, 228, 6
See application file for complete search history.

(56) References Cited

U.S. PATENT DOCUMENTS

| | | | | | |
|---|---|---|---|---|---|
| 2,099,902 | A | * | 11/1937 | Moyer et al. ................. | 56/7 |
| 3,177,638 | A | * | 4/1965 | Johnson ....................... | 56/7 |
| 3,347,558 | A | * | 10/1967 | Grimes et al. ............... | 280/775 |
| 3,429,109 | A | * | 2/1969 | Heth et al. ................... | 56/7 |
| 3,563,011 | A | * | 2/1971 | Bramley et al. .............. | 56/7 |
| 3,717,981 | A | * | 2/1973 | van der Lely ................ | 56/6 |
| 3,808,778 | A | * | 5/1974 | Hoffmeyer .................... | 56/7 |
| 3,963,132 | A | * | 6/1976 | Dufour ........................ | 414/719 |
| 4,421,188 | A | * | 12/1983 | Fredriksen .................. | 180/327 |
| 4,427,090 | A | * | 1/1984 | Fredriksen et al. .......... | 180/327 |
| 4,487,286 | A | * | 12/1984 | van der Lely ................ | 180/235 |
| 4,700,784 | A | * | 10/1987 | Wiebe et al. ................ | 172/126 |
| 4,711,072 | A | * | 12/1987 | Aldred ......................... | 56/6 |
| 4,769,976 | A | * | 9/1988 | Bassett et al. .............. | 56/7 |
| 4,777,786 | A | * | 10/1988 | Arnold ........................ | 56/199 |
| 4,926,621 | A | * | 5/1990 | Torras ........................ | 56/6 |
| 5,029,436 | A | * | 7/1991 | Fredriksen et al. .......... | 56/14.5 |
| 5,086,869 | A | * | 2/1992 | Newbery et al. ............. | 180/329 |
| 5,233,817 | A | * | 8/1993 | Nicol ........................... | 56/6 |
| 5,664,909 | A | * | 9/1997 | Lindgren et al. ............. | 404/122 |
| 5,715,667 | A | * | 2/1998 | Goman et al. ................ | 56/13.6 |

(Continued)

FOREIGN PATENT DOCUMENTS

EP 0 113 335 7/1984

(Continued)

*Primary Examiner*—Árpád Fábián-Kovács
(74) *Attorney, Agent, or Firm*—Oblon, Spivak, McClelland, Maier & Neustadt, P.C.

(57) ABSTRACT

An agricultural machine for cutting standing products comprising a carrier vehicle to which there are connected at least one frontal working unit positioned, during work and when viewed in a direction of forward travel of the carrier vehicle, forward of said carrier vehicle, and at least two lateral working units positioned, during work, on each side of a working area of said frontal working unit(s) and situated behind said frontal working unit(s) and being connected to carrier arms which are articulated to the carrier vehicle and allow said lateral working units to be moved into at least one work position situated level with the front wheels of the carrier vehicle and into a folded transport position, and the carrier vehicle comprising a driver's cab that can be moved toward the front or toward the rear of said carrier vehicle.

22 Claims, 6 Drawing Sheets

U.S. PATENT DOCUMENTS

| | | | | |
|---|---|---|---|---|
| 5,813,202 | A * | 9/1998 | Goman et al. | 56/15.2 |
| 6,047,530 | A * | 4/2000 | Bednar | 56/6 |
| 6,658,828 | B2 * | 12/2003 | Franet | 56/7 |
| 6,814,174 | B2 * | 11/2004 | Fluent et al. | 180/329 |
| 6,860,335 | B2 * | 3/2005 | Arnett | 172/311 |
| 6,902,010 | B2 * | 6/2005 | Shoup | 172/456 |
| 7,003,938 | B2 * | 2/2006 | Erdmann et al. | 56/228 |
| 7,032,703 | B2 * | 4/2006 | Wulfert et al. | 180/329 |
| 7,175,520 | B2 * | 2/2007 | Matousek et al. | 460/150 |
| 7,222,480 | B2 * | 5/2007 | Erdmann et al. | 56/228 |
| 2002/0017389 | A1 * | 2/2002 | Moser et al. | 172/311 |
| 2004/0216437 | A1 * | 11/2004 | Erdmann et al. | 56/10.1 |
| 2005/0126153 | A1 | 6/2005 | Hironimus et al. | |
| 2005/0210850 | A1 * | 9/2005 | Erdmann et al. | 56/10.1 |
| 2005/0252183 | A1 | 11/2005 | Hironimus et al. | |
| 2006/0201732 | A1 * | 9/2006 | Dunn et al. | 180/331 |
| 2006/0254238 | A1 * | 11/2006 | Walter et al. | 56/15.2 |

FOREIGN PATENT DOCUMENTS

| | | |
|---|---|---|
| EP | 1068791 A1 * | 1/2001 |
| EP | 1 405 556 A2 | 4/2004 |
| EP | 1 468 598 A2 | 10/2004 |
| FR | 2 837 347 | 9/2003 |

* cited by examiner

AGRICULTURAL MACHINE FOR CUTTING PRODUCTS

BACKGROUND OF THE INVENTION

1. Field of the Invention

The present invention relates to an agricultural machine comprising a carrier vehicle and several working units intended to cut standing plants, said working units being connected to said carrier vehicle.

2. Discussion of the Background

A self-propelled mower comprising a carrier vehicle and three working units so as to cover a wide cutting area and improve the productivity of the machine exists in the prior art. More specifically, this mower comprises a frontal working unit and two lateral working units. This mower has a working width that can be as much as somewhat over 9 meters. In order to move it around on the roads, it has been necessary to provide a smaller-width transport position in which the lateral working units are pivoted vertically.

In order to increase the working width still further and thus improve cutting performance, a greater number of working units has been envisaged. Patent FR 2 837 347 in particular anticipates the possibility of using at least two frontal working units situated in the direction of forward travel of the carrier vehicle in front of the latter, and at least two lateral working units. A transport position is anticipated for each working unit and more specifically a substantially vertical folding position for the two lateral working units.

A carrier vehicle such as this comprising three frontal working units and two lateral working units has recently been marketed. The lateral working units of this agricultural machine are articulated on the sides and in the middle of the carrier vehicle and are deployed using telescopic arms.

The lateral working units in the known prior art are perpendicular to the length of the carrier vehicle and situated between the groups of tires, namely substantially in the middle of the vehicle, or at the rear of said vehicle. This configuration of the lateral working units has the drawback that the driver of the carrier vehicle cannot readily and constantly see all the working units and anticipate unevennesses of the ground or obstacles by raising said working units, when turning to avoid said obstacles or alternatively when adapting the speed of said vehicle. Said arrangement of the lateral working units also presents a major drawback when driving the agricultural machine around bends.

In fact, in this configuration of use, the working units no longer offer a recut zone, that is to say an overlapping zone of the working units, and uncut strips of land therefore remain, these strips increasing in width with the tightness of the curve through which the agricultural machine is driven. In order to palliate this problem, the recut zones may be increased when the agricultural machine is negotiating a bend, but that leads to a higher overall cost of agricultural machine with a solution that is not entirely satisfactory.

As rotary movements and curves of the carrier vehicle in the fields are extremely frequent, this problem of completely cutting the plants is, for many farmers, important to solve.

In the agricultural machines already described and in the context of the present invention, the working units arranged around the carrier vehicle may be plant-cutting elements alone or cutting elements associated with devices for conditioning the forage, and therefore agricultural machines categorized as mowers or as mower-conditioners. Such agricultural machines may also comprise wide-spreading devices or devices for grouping cut plants into windrows, to make it easier to pick them up later using a silo loader for example.

In order to cut the widest possible working area, the working units have increasingly long lengths. Folding said working units about the carrier vehicle in the transport position so as to comply with the maximum authorized dimension for travel on the public highway leads to a serious problem regarding visibility from the cab of said carrier vehicle for driving and to great difficulties in positioning the working units around the carrier vehicle.

A problem therefore arises that is connected both with the positioning of the working units as functionally as possible during work, particularly in the case of large-sized working units, and a difficulty connected with the transport configuration which needs to allow the agricultural machine to be driven easily on the public highway.

SUMMARY OF THE INVENTION

It is therefore an objective of the invention to solve these main difficulties by guaranteeing the driver good visibility under all conditions of work and of transport, and to do so in complete safety regardless of the working conditions.

The present invention therefore relates to an agricultural machine for cutting standing products comprising a carrier vehicle to which are connected at least one frontal working unit positioned, during work and when viewed in a direction of forward travel of the carrier vehicle, forward of said carrier vehicle, and at least two lateral working units positioned, during work, on each side of a working area of said frontal working unit(s) and situated behind said frontal working unit (s), wherein the lateral working units are connected to carrier arms which are articulated to the carrier vehicle and allow said lateral working units to be moved into at least one work position situated substantially level with the front wheels of the carrier vehicle and into a folded transport position, and wherein the carrier vehicle comprises a driver's cab that can be moved toward the front or toward the rear of said carrier vehicle.

Arranging the lateral working units around the carrier vehicle and the configuration whereby these are folded around the carrier vehicle, according to the invention, lead to an agricultural machine that has a good efficiency but also a reduced transport width.

Furthermore, positioning said lateral working units substantially level with the front wheels and on the sides of the carrier vehicle and moving the driver's cab forward when the lateral working units are in this forward position, allow a good visibility to all the working units.

Furthermore, in this configuration according to the invention, the instantaneous center of rotation, in bends or about-turns, lies substantially on a line passing through the lateral working units, which makes it possible to maintain a good overlap between the frontal working units and the lateral working units in order to prevent uncut strips of land remaining between them.

The use of an agricultural machine with multiple working units according to the invention offers a combination that allows a high output.

BRIEF DESCRIPTION OF THE DRAWINGS

Other characteristics and advantages of the invention will become apparent from the description which will follow with reference to the appended drawings which are given merely by way of nonlimiting examples. In these drawings.

DESCRIPTION OF THE PREFERRED EMBODIMENT

Figure 1:
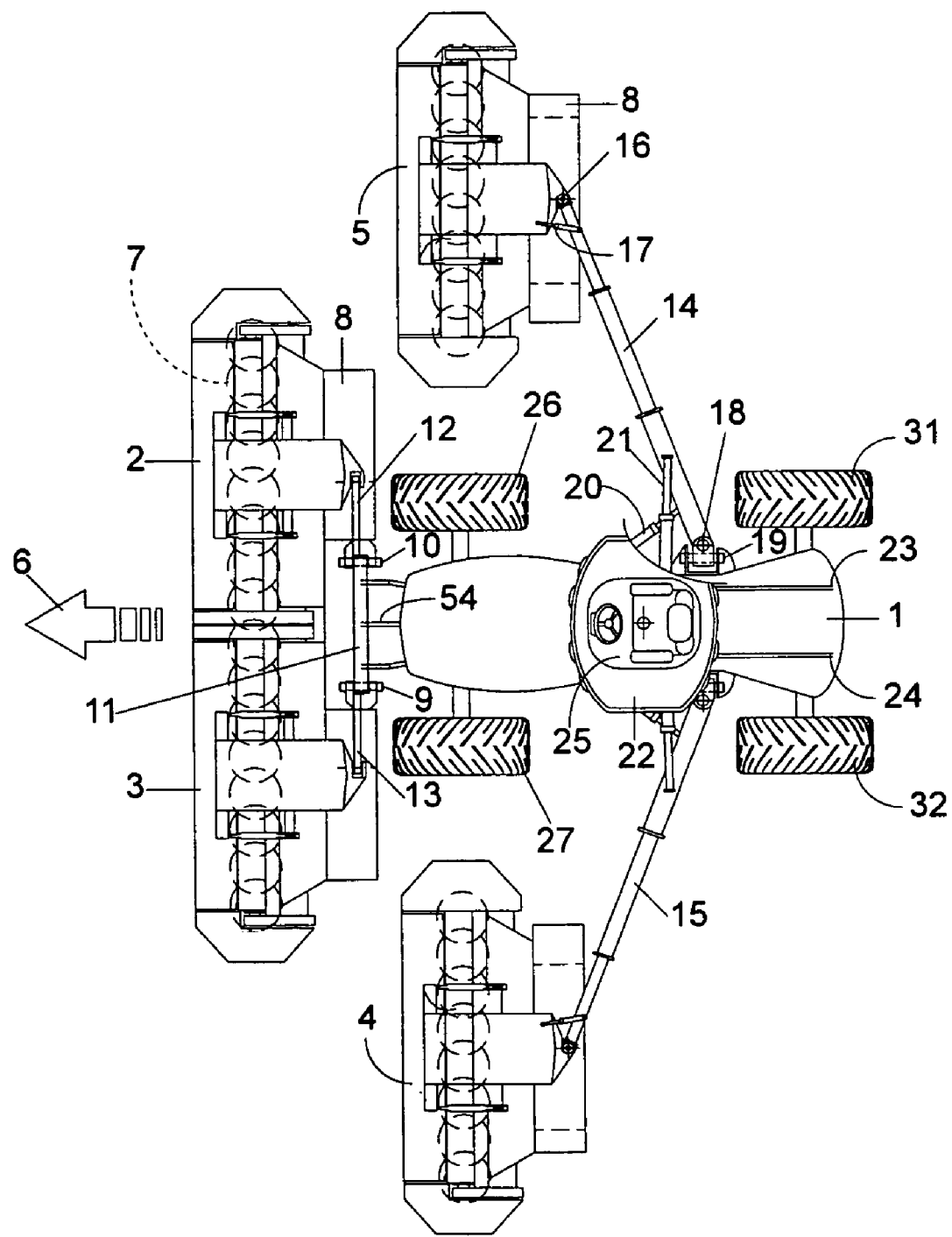
FIG. 1 is a view from above of an agricultural machine according to the invention having two frontal working units and two lateral working units, the working units being in the work position.

In a first embodiment of the invention illustrated in FIG. 1, the carrier vehicle 1 has four working units: two frontal working units 2, 3 and two lateral working units 4, 5. In the work position illustrated in this FIG. 1, the direction of forward travel 6 represented by the arrow is the direction of work in the field.

In the example depicted, the agricultural machine is a mower-conditioner. For this purpose, the lateral 4, 5 and frontal 2, 3 units comprise at least one cutter bar 7, a plant conditioning device (not depicted in detail) situated partially above said cutter bar 7, and a device 8 for grouping these cut plants together into windrows.

Each cutter bar 7 consists, in a way known per se, of a cutter bar with cutting disks which are rotationally driven during work.

Various known devices for conditioning plants immediately after cutting and able to treat the plants in order to accelerate their drying time and shorten the delay before collection are conceivable, such as a rotor with flails or compression rollers for example. These grouping devices 8 may consist of conveyor belts or other known devices. The disks of the cutter bars 7, the product conditioning devices and the devices 8 for grouping the products together may be driven hydraulically, mechanically or in some other way, from the carrier vehicle 1.

The two frontal working units 2, 3 are connected and articulated by means of respective axes 9 and 10 directed in the direction of forward travel 6 to a common support 11. They can be moved heightwise about said axes 9 and 10 by means of corresponding hydraulic rams 12 and 13. The support 11 is coupled to a hitching device 54 of the carrier vehicle 1, which hitching device 54 allows the support 11 and the two frontal working units 2 and 3 to be raised and lowered.

The two lateral working units 4, 5 are mounted at the ends of respective telescopic arms 14, 15 by means of axes 16 that are substantially vertical in the work position. Respective hydraulic rams 17 which are connected to said arms 14, 15 and to the lateral units 4, 5 allow the latter to be pivoted about the axes 16 to modify their orientation. The telescopic arms 14 and 15 are connected to the sides of the carrier vehicle 1, substantially in the rear one-third of the latter. For each arm 14 and 15, this connection is achieved by means of a substantially vertical axis 18 about which it can be moved in a substantially horizontal plane, and of a substantially horizontal axis 19 allowing it to be raised into a substantially vertical position. Movements about these axes 18 and 19 are brought about by means of respective hydraulic rams 20 and 21 which are articulated, on one hand, to the carrier vehicle 1 and, on another hand, to the corresponding arm 14, 15.

The arms 14 and 15 are advantageously made in several telescopic parts so that the lateral working units 4 and 5 can be moved away from or brought closer to the carrier vehicle 1. The telescopic parts are actuated in a way known per se using hydraulic rams for example.

Figure 3:
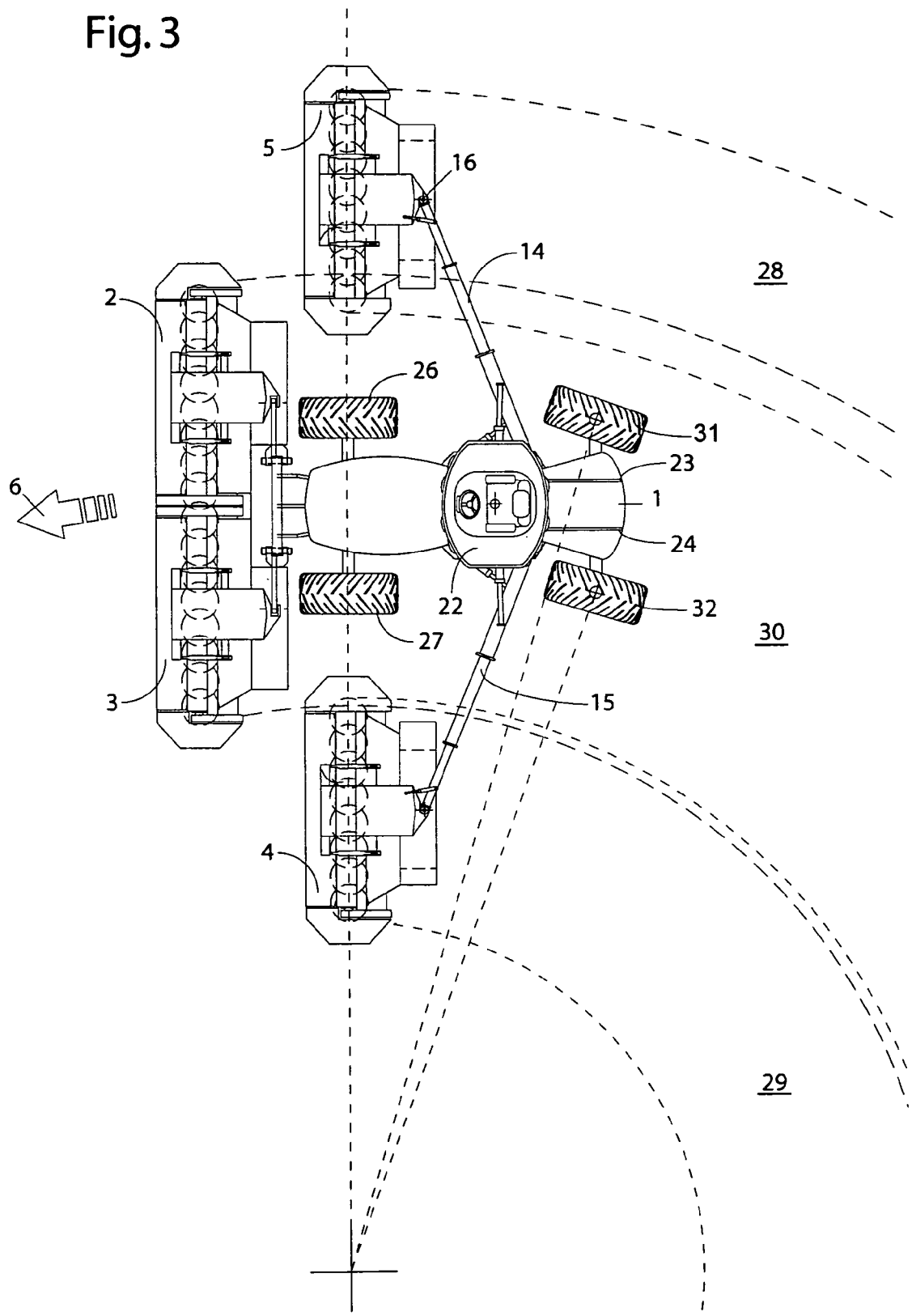
FIG. 3 illustrates the agricultural machine depicted in FIG. 1 during work in a bend, with the working units in the work position.

The telescopic arms 14 and 15 allow the lateral working units 4, 5 to be positioned substantially in line with the axle of the front wheels 9, 10 of the carrier vehicle 1 (see FIGS. 1 and 3).

When the working units 2, 3, 4, 5 are in this arrangement, the cutting areas of the lateral working units 4, 5 overlap the cutting areas of the frontal working units 2, 3 so as not to leave uncut strips of plants.

In this work position, the driver's cab 22 of the carrier vehicle 1 faces in the direction of forward travel 6 for work and advantageously, when viewed from above, lies between the telescopic arms 14 and 15. In this position, the driver has a very good visibility to all the working units 2, 3, 4, 5 and can therefore easily monitor said working units, without tiring, even after many hours of driving.

The driver's cab 22 is mounted on rails 23 and 24 on which it can be moved longitudinally. In addition, the driver's seat 25 in said cab 22 can be rotated through 180° in order to reverse the direction of forward travel for transport as depicted by the arrow 33 in FIG. 2.

FIG. 3 illustrates the carrier vehicle 1 in its work position according to FIG. 1 and moving in the direction of forward travel 6 around a curve on the field that is to be mown. The placing of the lateral working units 4, 5 substantially on the axis of the axle of the wheels 26 and 27 shows that the cutting areas 28 and 29 of the lateral working units 4 and 5 overlap the cutting area 30 of the whole frontal working units 2 and 3.

In this work position, it is the rear wheels 31 and 32 that pivot in order to steer the carrier vehicle 1 and working units 2, 3, 4, 5 assembly.

Figure 4:
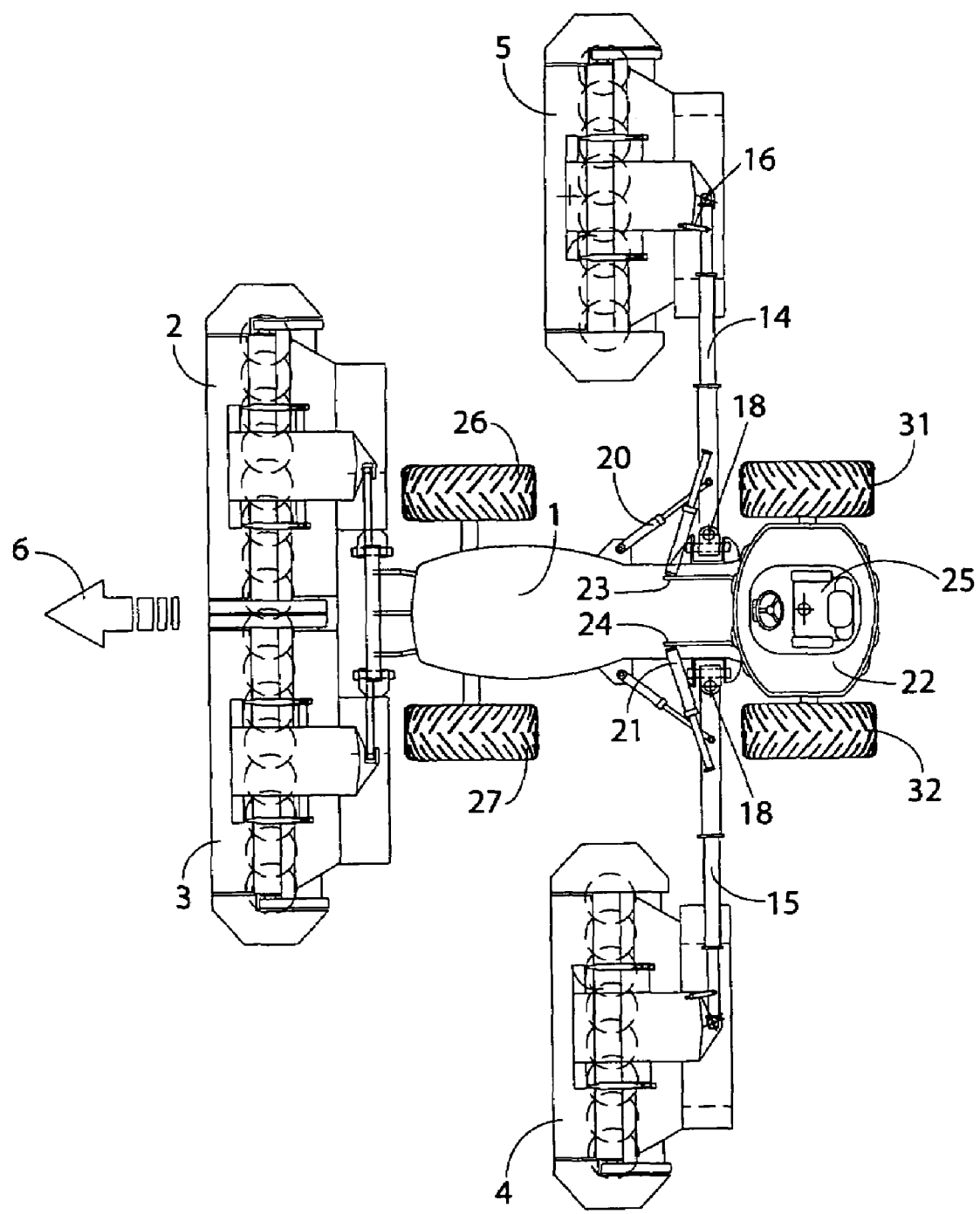
FIG. 4 illustrates the agricultural machine depicted in FIG. 1 in another working position.

FIG. 4 illustrates a second work position which will preferably be chosen for working on grounds with significant unevennesses. In this position, the driver's cab 22 has been moved backward on the rails 23 and 24. The lateral working units 4 and 5 have also been pivoted backward about the axes 18 of their carrier arms 14 and 15 by means of the hydraulic rams 20 and their orientation has been corrected by pivoting about their respective axis 16 by virtue of the rams 17. In addition, said carrier arms 14 and 15 have been somewhat shortened so as to maintain a sufficient overlap of the working areas 28, 29 and 30. Thus, the two lateral working units 4, 5 are situated, when viewed from above, in a region extending between the front wheels 26, 27 and the rear wheels 31, 32 of the carrier vehicle 1. In this position, the mass of the working units 2, 3, 4, 5 is then better distributed over the carrier vehicle 1, and this substantially improves the stability of the agricultural machine as it moves over such highly uneven ground. Of course, it is perfectly conceivable for the two lateral working units 4, 5 to occupy different intermediate work positions located between the first work position (FIGS. 1 and 3) and this second work position depending on the weight transfer that is to be obtained (the transfer of weight to the rear wheels 31, 32 being inversely proportionate to the working width of the agricultural machine).

Figure 2:
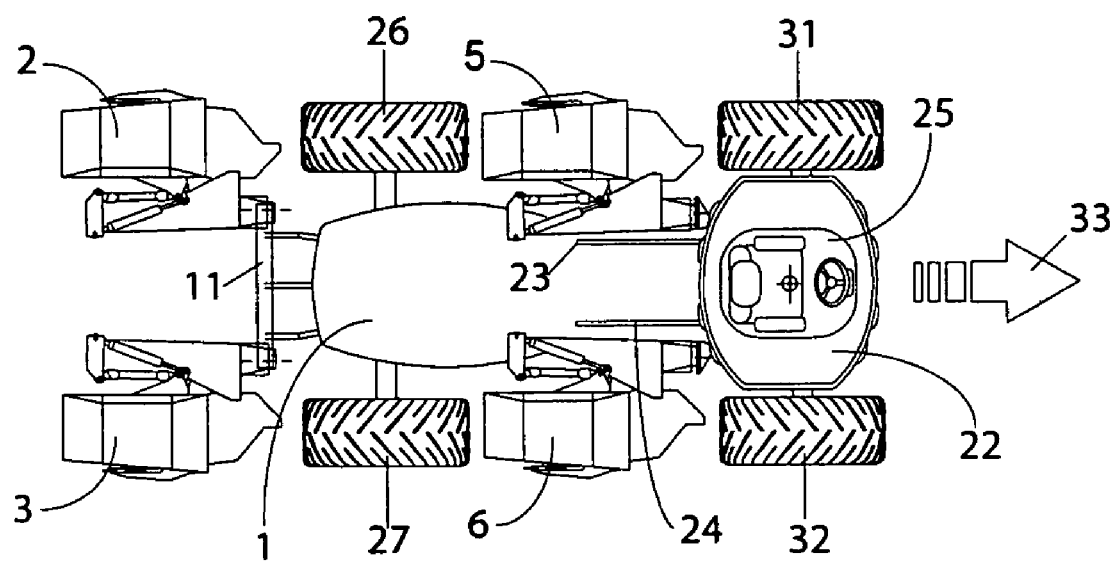
FIG. 2 is a view from above of the agricultural machine depicted in FIG. 1, in which the working units are folded into the transport position and in which the driver's cab has also been moved into the transport position.

FIG. 2 illustrates the transport position in which the frontal working units 2, 3 and the lateral working units 4, 5 have been folded into a substantially vertical position under the combined action of the hydraulic rams 12, 13, 17, 20 and 21 and of the hydraulic rams actuating the translational movement of the telescopic parts of the arms 14, 15, positioned on each side of the carrier vehicle 1.

Folding the frontal working units 2, 3 has the effect of positioning them substantially behind the wheels 26, 27 when the carrier vehicle 1 is moving in the transport direction 33.

The lateral working units 4, 5 are placed in a vertically folded configuration between the groups of wheels 26-27 and 31-32 of the carrier vehicle 1.

After folding, the whole working units 2, 3, 4, 5 barely or hardly increase the overall width of the agricultural machine.

In this transport position, the driver's cab 22 is moved along the rails 23 and 24 to the end of the carrier vehicle 1 and the driver's seat 25 has been pivoted through 180° about a vertical axis so as to allow the carrier vehicle 1 to move along in the transport direction symbolized by the arrow 33. This transport direction 33 is the opposite direction to the direction of forward travel 6 for the work of cutting plants.

Moving the driver's cab 22 into the transport position opens up enough space on the carrier vehicle 1 to store the lateral working units 4, 5. Furthermore, the forward position of said driver's cab 22 gives the driver good visibility during transport.

It is clearly apparent from FIG. 2 that, in this transport position, the driver of the carrier vehicle 1 is not in any way impeded by the folded lateral 4, 5 and frontal 2, 3 working units when driving along the highway in the transport direction 33.

Thus, advantageously according to the invention, the driver's cab 22 of the carrier vehicle 1 can be moved longitudinally and the driver's seat 25 can be reversed about a vertical axis so as to allow the agricultural machine, when the frontal 2, 3 and lateral 4, 5 working units are in the transport position, to move in the transport direction 33 which is the opposite direction to the direction of forward travel 6 during work.

The agricultural machine is adapted, particularly in terms of its drive line, and particularly in terms of its driving means, to allow it to move in both directions 6 and 33.

Figure 5:
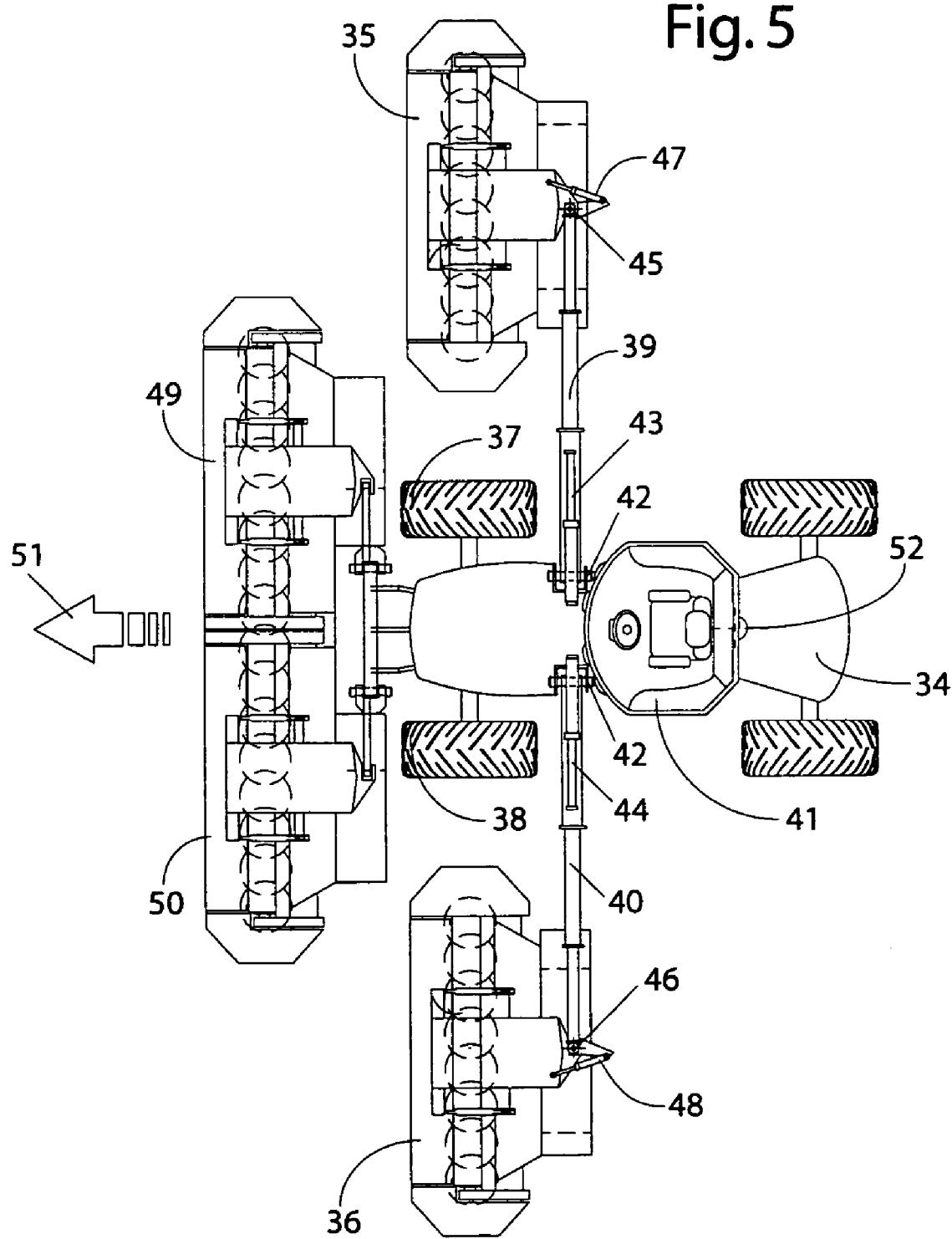
FIG. 5 depicts an agricultural machine according to a second embodiment of the invention, the working units being in the work position.
Figure 6:
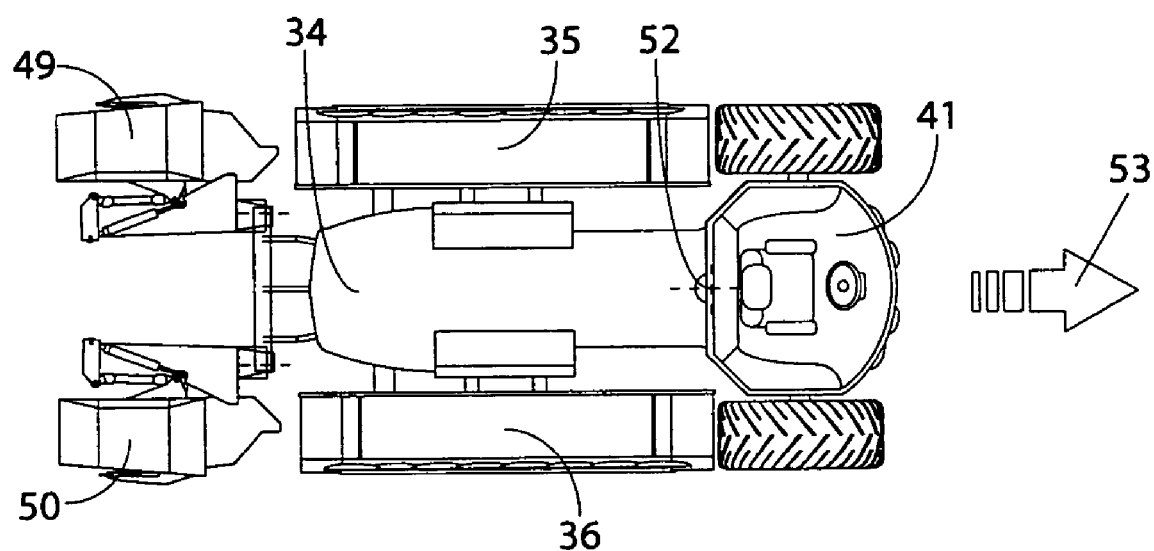
FIG. 6 illustrates the transport position of the working units of the agricultural machine according to the second embodiment of the invention depicted in FIG. 5, with the driver's cab pivoted through 180°.

According to a second embodiment illustrated in FIGS. 5 and 6, the carrier vehicle 34 comprises lateral working units 35, 36 always positioned level with the front wheels 37, 38 and along the axis of the axle connecting these two front wheels 37, 38. However, the telescopic arms 39, 40 are positioned in front of the driver's cab 41 and substantially perpendicular with respect to the carrier vehicle 34. These telescopic arms 39, 40 are articulated to the carrier vehicle 34 by means of substantially horizontal axes 42 situated in front of the driver's cab 41 and directed in the direction of forward travel 51. Said telescopic arms 39, 40 can be moved about these axes 42 using respective hydraulic rams 43 and 44 which are also connected to the carrier vehicle 34. The lateral working units 35 and 36 are articulated to the ends of these arms 39, 40 by respective axes 45, 46 that are substantially vertical in the work position, and can be pivoted about these axes 45, 46 using hydraulic rams 47, 48.

In this second embodiment, the frontal working units 49 and 50 are positioned in the same way as in the first embodiment.

The carrier vehicle 34 moves in the direction of forward travel 51 for work.

Aside from the positioning of the telescopic arms 39, 40 on the carrier vehicle 34, this second embodiment also differs in the configuration of the driver's cab 41 which is mounted on a pivot 52 so that it can pivot through 180° and thus facing the opposite direction 53 as depicted in FIG. 6.

Rotating the driver's cab 41 gives various options for positioning the lateral working units 35, 36 in the transport position.

One of these options is depicted in FIG. 6 in which the driver's cab 41 has been moved in the transport direction 53. This transport direction 53 is the opposite direction to the direction of forward travel 51 during work, as it was in the first embodiment.

In order for the driver's cab 41 to reach the position illustrated in FIG. 6, said driver's cab 41 has been pivoted through 180° about the vertical pivot 52 using any known means.

In this transport position, the frontal working units 49 and 50 have been folded vertically, as previously, while the lateral working units 35, 36 have, on one hand, been folded upwards, about the axes 42 of their respective carrier arms 39 and 40 and, on another hand, pivoted into a substantially horizontal position by pivoting about the axes 45 and 46 by means of the hydraulic rams 47 and 48. The telescopic carrier arms 39 and 40 are also shortened so as to reduce the overall height.

In the transport position depicted in FIG. 6, the lateral working units 35 and 36 are positioned along the carrier vehicle 34 at the rear of the driver's cab 41 and partially over the wheels 37, 38.

This second embodiment in fact allows various possible positionings, vertically or horizontally, or even at an angle, of the lateral working units 35, 36 along the carrier vehicle 34. In this embodiment, as in the preceding one, moving the driver's cab 41 frees up space on the carrier vehicle 34 to arrange the lateral working units 35, 36 in the transport position.

There are various options for folding the working units about the carrier vehicle and for placing said working units in the transport position, particularly in a horizontal or in a vertical configuration, without departing from the scope of the invention.

A lower or higher number of frontal and lateral working units may be envisaged and said working units may be mowers, mower-conditioners or even other working units having to operate over wide widths without untreated spaces being caused by maneuvers and rotary movements of the agricultural machine.

The driver's cab may be in various shapes and sizes, contain all the customary functionalities associated with the working units and with driving the carrier vehicle, or just some of them.

As an alternative to the first embodiment, a driver's cab that can be moved only longitudinally along the carrier vehicle, for example on rails and with, in this case, a second steering wheel and the necessary controls duplicated, possibly with a swiveling seat for the driver, or a second driver's seat for the opposite direction may be anticipated as an alternative. The various possible combinations of translational movement along the carrier vehicle, with or without 180° rotation of the driver's cab or of the driver's seat are contained within the scope of the invention.

Of course, the invention is not restricted to the embodiments described and depicted by way of examples but also encompasses all technical equivalents and combinations thereof.

What is claimed as new and desired to be secured by Letters Patent of the United States is:

1. An agricultural machine for cutting standing products comprising:
   a carrier vehicle including front wheels and rear wheels,
   at least one frontal working unit connected to said carrier vehicle and situated forward of said carrier vehicle during work and when viewed in a direction of forward travel of the carrier vehicle, and at least two lateral working units situated, during work, on each side of a working area of said at least one frontal working unit and situated behind said at least one frontal working unit, said at least two lateral working units each being connected via a respective first substantially vertical axis to carrier arms, said carrier arms each being articulated via a respective second substantially vertical axis and via a respective substantially horizontal axis to the carrier vehicle and configured to move said lateral working units into a folded transport position and into at least a first work position situated substantially level with the front wheels of the carrier vehicle and in which each of said two lateral working units is oriented in alignment with an axle of said front wheels of said carrier vehicle, and into at least a second work position situated behind said first work position, a driver's cab mounted on said carrier vehicle and being movable along said vehicle in a first position near a front end of the carrier vehicle and a second position near a rear end of said vehicle.

2. An agricultural machine as claimed in claim 1, wherein the driver's cab of the carrier vehicle is configured to pivot through 180° about a vertical pivot so as to facilitate placement of the lateral working units in the transport position and allow the carrier vehicle to move in the transport direction when the frontal working units and lateral working units are in the transport position, the transport direction being the opposite direction to the direction of forward travel during work.

3. An agricultural machine as claimed in claim 1, wherein the driver's cab of the carrier vehicle is configured to move on rails along the carrier vehicle so as to facilitate the placement of the lateral working units in the first work position and in the transport position and provide visibility for driving said carrier vehicle.

4. An agricultural machine as claimed in claim 3, wherein the driver's cab has means for driving in the transport direction, when the working units are in the transport position, the transport direction being the opposite direction to the direction of forward travel during work.

5. An agricultural machine as claimed in claim 1, wherein the carrier arms of the lateral working units are telescopic carrier arms and wherein the lateral working units are articulated on said telescopic carrier arms via said substantially vertical axes.

6. An agricultural machine as claimed in claim 5, further comprising hydraulic rams configured to move the telescopic carrier arms and the lateral working units about said first and second substantially vertical axes, wherein said hydraulic rams are articulated to said telescopic carrier arms and to the carrier vehicle.

7. An agricultural machine as claimed in claim 5, wherein the telescopic carrier arms are articulated to the carrier vehicle via said substantially horizontal axes.

8. An agricultural machine as claimed in claim 7, further comprising hydraulic rams configured to move the telescopic carrier arms about said substantially horizontal axes, wherein said hydraulic rams are articulated to said telescopic carrier arms and to the carrier vehicle.

9. An agricultural machine as claimed in claim 5, wherein the telescopic carrier arms are articulated to the carrier vehicle substantially in a rear one third of the carrier vehicle.

10. An agricultural machine as claimed in claim 1, wherein said second work position extends, when viewed from above, in a zone lying between the front wheels and rear wheels of the carrier vehicle.

11. An agricultural machine as claimed in claim 10, wherein the lateral working units are configured to occupy various intermediate work positions situated between the first work position extending substantially level with the front wheels of the carrier vehicle and said second work position.

12. An agricultural machine as claimed in claim 5, wherein the telescopic arms are positioned, when viewed from above, forward of the driver's cab and extend substantially perpendicular to the carrier vehicle during work.

13. An agricultural machine as claimed in claim 1, wherein the lateral working units are folded in the transport position substantially vertically with regard to the plane of work.

14. An agricultural machine as claimed in claim 1, wherein the lateral working units are folded, in the transport position, above and along the carrier vehicle, in a substantially horizontal position.

15. An agricultural machine as claimed in claim 1, comprising two frontal working units which are folded, in the transport position, substantially vertically with regard to a plane of work.

16. An agricultural machine as claimed in claim 1, wherein each of the lateral working units and the at least one frontal working unit comprises a cutter bar and a device for conditioning cut plants and a device for grouping said cut plants into windrows.

17. An agricultural machine as claimed in claim 13, wherein the carrier vehicle can move in two opposite directions, a direction of forward travel for work and a transport direction.

18. An agricultural machine as claimed in claim 14, wherein the carrier vehicle can move in two opposite directions, a direction of forward travel for work and a transport direction.

19. An agricultural machine as claimed in claim 15, wherein the carrier vehicle can move in two opposite directions, a direction of forward travel for work and a transport direction.

20. An agricultural machine as claimed in claim 1, wherein said frontal working unit and said lateral working units are configured such that, in said first work position, cutting areas of said lateral working units overlap a cutting area of said frontal working unit.

21. An agricultural machine as claimed in claim 1, in which the second respective substantially vertical axis and respective substantially horizontal axis articulating the carrier arms to the carrier vehicle are disposed on a first end of each of the carrier arms, and the first respective substantially vertical axis articulating each of the lateral working units is disposed at a second end of each of the carrier arms.

22. An agricultural machine as claimed in claim 1, in which, in the first work position, the first end of the carrier arms in which the second respective substantially vertical axis and respective substantially horizontal axis are disposed is located behind the second end in relation to the direction of forward travel of the carrier vehicle.

* * * * *